(12) United States Patent
Hill

(10) Patent No.: US 8,318,623 B2
(45) Date of Patent: Nov. 27, 2012

(54) DIELECTRIC CERAMIC MATERIALS AND ASSOCIATED METHODS

(75) Inventor: Michael D. Hill, Frederick, MD (US)

(73) Assignee: Skyworks Solutions, Inc., Irvine, CA (US)

(*) Notice: Subject to any disclaimer, the term of this patent is extended or adjusted under 35 U.S.C. 154(b) by 4 days.

(21) Appl. No.: 12/999,294

(22) PCT Filed: Dec. 16, 2009

(86) PCT No.: PCT/US2009/068262
§ 371 (c)(1),
(2), (4) Date: Dec. 15, 2010

(87) PCT Pub. No.: WO2011/075123
PCT Pub. Date: Jun. 23, 2011

(65) Prior Publication Data
US 2011/0263411 A1    Oct. 27, 2011

(51) Int. Cl.
*C04B 35/468* (2006.01)
(52) U.S. Cl. ......... 501/137; 501/138; 501/139; 264/615
(58) Field of Classification Search .................. 501/137, 501/138, 139; 264/615
See application file for complete search history.

(56) References Cited

U.S. PATENT DOCUMENTS

| | | | |
|---|---|---|---|
| 4,394,456 A | 7/1983 | Sakabe et al. |
| 4,753,906 A | 6/1988 | Nishigaki et al. |
| 5,011,804 A | 4/1991 | Bergna et al. |
| 5,105,333 A | 4/1992 | Yamano et al. |
| 5,182,240 A | 1/1993 | Hirai et al. |
| 5,185,304 A | 2/1993 | Hirai et al. |
| 5,223,462 A | 6/1993 | Okawa |
| 5,310,710 A | 5/1994 | Takase et al. |
| 5,376,603 A | 12/1994 | Hirahara et al. |
| 5,650,368 A | 7/1997 | Tateishi et al. |
| 5,688,732 A | 11/1997 | Park et al. |
| 5,750,452 A | 5/1998 | Park et al. |
| 6,107,227 A | 8/2000 | Jacquin et al. |
| 6,165,927 A | 12/2000 | Sato et al. |
| 6,195,250 B1 | 2/2001 | Matoba et al. |
| 6,304,157 B1 | 10/2001 | Wada et al. |
| 6,429,164 B1 | 8/2002 | Wada et al. |
| 6,458,734 B1 | 10/2002 | Sugimoto et al. |
| 7,091,147 B2 | 8/2006 | Oobuchi et al. |
| 2002/0132127 A1 | 9/2002 | Naito |
| 2003/0119657 A1 | 6/2003 | Tosa et al. |
| 2006/0160693 A1 | 7/2006 | Ito |
| 2007/0087282 A1 | 4/2007 | Linuma |
| 2009/0297432 A1 | 12/2009 | Hill |

FOREIGN PATENT DOCUMENTS

| | | |
|---|---|---|
| EP | 0939413 A1 | 1/1999 |
| EP | 0966002 A1 | 12/1999 |
| WO | 9721642 A1 | 6/1997 |
| WO | 2010047723 A1 | 4/2010 |

OTHER PUBLICATIONS

International Search Report and Written Opinion from corresponding International Application No. PCT/US2009/068262 dated Sep. 14, 2010.

*Primary Examiner* — Karl Group
(74) *Attorney, Agent, or Firm* — Lando & Anastasi, LLP

(57) ABSTRACT

Ceramic dielectric materials that can be utilized as electronic components, such as dielectric resonators are disclosed. The material can have a formula $Ba_{12}M'_{(28+a/3)}Ti_{(54-a-b)}M''_a Ge_b O_{162}$, wherein M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$. The ceramic dielectric material can also have a formula $Ba_{12}M'_{(28+2x/3)}Ti_{(54-x-y)}M'''_x Ge_y O_{162}$, wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$. One or more aspects of the present invention pertain to methods of fabricating a dielectric component. Methods of synthesizing the disclosed ceramic dielectric materials are also disclosed.

18 Claims, 4 Drawing Sheets

DIELECTRIC CERAMIC MATERIALS AND ASSOCIATED METHODS

BACKGROUND

1. Field

The present invention relates to dielectric materials and method of fabricating dielectric materials and in particular, to dielectric ceramic materials that can be used as electronic components and methods of fabrication and use of dielectric ceramic materials.

2. Discussion of Related Art

Sakabe et al., in U.S. Pat. No. 4,394,456, disclosed temperature-compensating ceramic dielectrics of neodymium titanates, barium titanates, titanium oxide, bismuth oxide, lead oxide, zinc oxide, and silicon oxide.

Nishigaki et al., in U.S. Pat. No. 4,753,906, disclosed a dielectric composition for microwave application.

Yamano et al., in U.S. Pat. No. 5,105,333, disclosed a temperature compensating ceramic dielectric of BaO, $TiO_2$, and $Nd_2O_3$.

Hirai et al., in U.S. Pat. No. 5,182,240, disclosed a dielectric ceramic composition of BaO, $TiO_2$, $Nd_2O_3$, and $Sm_2O_3$, with $Al_2O_3$.

Hirai et al., in U.S. Pat. No. 5,185,304, disclosed a dielectric ceramic composition of BaO, $TiO_2$, $Sm_2O_3$, and bismuth oxide, with $Al_2O_3$.

Okawa, in U.S. Pat. No. 5,223,462, disclosed a dielectric ceramic with manganese in a main composition of $BaO.Nd_2O_3.TiO_2.Bi_2O_3$.

Takase et al., in U.S. Pat. No. 5,310,710, disclosed a microwave dielectric ceramic composition of $BaO.Nd_2O_3.TiO_2$, and $Y_2O_3$ and $Al_2O_3$.

Hirahara et al., in U.S. Pat. No. 5,376,603, disclosed a dielectric ceramic for microwaves of $La_2O_3.CaO.TiO_2.MgO$ or $BaO.Nd_2O_3.TiO_2$.

Tateishi et al., in U.S. Pat. No. 5,650,368, disclosed a dielectric ceramic composition with main components of Ba, Nd or Nd and Sm, and Ti or Ti and Zr or Sn, and an assistant component of Mn.

Park et al., in U.S. Pat. No. 5,688,732, disclosed dielectric ceramic compositions for microwave applications of BaO, $Pb_2O_3$, $Nd_2O_3$, cerium oxide, $La_2O_3$, and $TiO_2$.

Park et al., in U.S. Pat. No. 5,750,452, disclosed a dielectric ceramic composition for microwave applications of BaO, $Sm_2O_3$, $TiO_2$, and $Pb_2O_3$.

Jacquin et al., in U.S. Pat. No. 6,107,227, disclosed a barium neodymium titanate dielectric ceramic composition incorporating $Sm_2O_3$ with constituents of BaO, $Nd_2O$, $Sm_2O_3$, $TiO_2$, $La_2O_3$, $Bi_2O_3$, and ZnO, for improved electrical performance.

Sato et al., in U.S. Pat. No. 6,165,927, disclosed a dielectric material and process for producing the same, the material based on $BaO-RE_2O_3-TiO_2$, with an alkali metal oxide, where RE is a rare earth element of Sm, or Sm with Nd and/or La.

Matoba et al., in U.S. Pat. No. 6,195,250 B1, disclosed a dielectric ceramic composition and laminated ceramic parts, the ceramic composition has a main component of BaO, $TiO_2$, and $RE_2O_3$, a lead free $B_2O_3.SiO_2$ glass, at least one V oxide, and W oxide, and optionally, CuO or MnO.

Wada et al., in U.S. Pat. No. 6,304,157 B1, disclosed a high frequency dielectric ceramic composition, a dielectric resonator, a dielectric filter, a dielectric duplexer, and a communication apparatus, with the composition of Ba, Ti, Nd, Sm, and Pr as primary components, and a bismuth compound as $Bi_2O_3$ and an iron compound as $Fe_2O_3$.

Wada et al., in U.S. Pat. No. 6,429,164 B1, disclosed a high frequency dielectric ceramic composition, a dielectric resonator, a dielectric filter, a dielectric duplexer, and a communication system, with the ceramic composition of a main component of $BaO.Sm_2O_3.Nd_2O_3.TiO_2$ and secondary components of a manganese compound, a thallium compound, and with zirconium.

Sugimoto et al., in U.S. Pat. No. 6,458,734 B1, disclosed a dielectric ceramic composition obtained by co-sintering $BaO.TiO_2.REO_{3/2}$, with RE being a rare earth element, with a metal having superior electrically conductivity, high relative dielectric constant, high Q, and small temperature coefficient.

Tosa et al., in U.S. Patent Application Publication No. 2003/0119657 A1, which was granted as U.S. Pat. No. 6,844, 284 B2, disclosed as dielectric porcelain composition of Ba, Nd, Pr, Bi, Ti, and at least one of Na and K.

Naito, in U.S. Patent Application Publication No. 2002/0132127 A1, which was granted as U.S. Pat. No. 6,599,855 B2, disclosed a non-reducing dielectric ceramic and ceramic electronic component, which contains tungsten-bronze-type crystal phase including barium, a rare earth element, and titanium, and a pyrochlore-type crystal phase including a rare earth element and titanium.

Oobuchi et al., in U.S. Patent Application Publication No. 2004/0176240 A1, which was granted as U.S. Pat. No. 7,091, 147 B2, disclosed dielectric compositions for firing at low temperatures and electronic parts, with a main composition of $BaO.TiO_2.Nd_2O_3.La_2O_3.Sm_2O_3.Bi_2O_3$, and a glass component of $B_2O_3$.

Yokoi et al., in European Patent Application Publication No. EP 0 939 979 A1, disclosed a dielectric material comprising a main composition of $BaO.RE_2O_3.TiO_2$, where RE represents at least one rare earth element; and at least one alkali metal oxide; and an ingredient derived from an oxygen supplying agent which releases oxygen on heating.

Sugimoto et al., in European Patent Application Publication No. EP 0 939 413 A1, disclosed a dielectric ceramic composition and ceramic electronic element using the ceramic composition of $BaO.TiO_2.REO_{3/2}.BiO_3$, where RE is a rare earth element, and with a glass of $SiO_2$, $B_2O_3$, and alkaline earth metal oxide, and $Li_2O$.

Sovarov et al., in International Application Publication No. WO 97/21642, disclosed microwave dielectric ceramics composed of barium, neodymium, gadolinium, titanium, and bismuth oxides.

SUMMARY

The present invention is directed to dielectric materials and related methods therefor. One or more aspects of the present invention can be directed to a dielectric composition with a material having a formula:

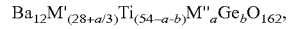

$$Ba_{12}M'_{(28+a/3)}Ti_{(54-a-b)}M''_a Ge_b O_{162},$$

wherein M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$. In some embodiments of the invention, b is about 3; and in other embodiments of the invention, b is about 0.1. M' can be at least one of neodymium, samarium, and yttrium, and M" can be one of aluminum and gallium; and in some instances of such embodiments of the invention, b can be about 3 or about 0.1. In some particular embodiments of the invention, M' is neodymium and samarium, M" is aluminum, and b is about 0.3.

One or more aspects of the invention can pertain to a dielectric composition with a material having a formula:

$$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$. In some embodiments pertinent to such aspects of the invention, M' is at least one of neodymium and samarium, and M''' is aluminum. Further embodiments pertinent thereto can involve a material wherein y is about 3 or to a material wherein y is about 0.1.

One or more aspects of the present invention pertain to methods of fabricating a dielectric component. In accordance with one or more embodiments of the present invention, the method can comprise one or more of blending a precursor mixture of compounds comprising a barium source, a titanium source, at least one rare earth element source, and at least one metal source; promoting reaction of the compounds to from a green material; comminuting the green material into green dielectric particles having a maximum target diameter; forming a green dielectric member from the green dielectric particles; sintering the green dielectric member to produce the dielectric component comprising a dielectric material having a formula:

$$Ba_{12}M'_{(28+a/3)}Ti_{(54-a-b)}M''_aGe_bO_{162}, \quad (I)$$

wherein $0 \leq a \leq 6$ and $0 \leq b \leq 3$, M' is at least one rare earth element selected from the group consisting of lanthanum, neodymium, samarium, gadolinium, and yttrium, M" is at least one element selected from aluminum, gallium, chromium, indium, scandium, and ytterbium. In other embodiments of the methods of the invention, the dielectric material can have a formula:

$$Ba_{12}M'_{(28+2x/3)}Ti_{(54-x-y)}Ti_{(54-x-y)}M'''_xGe_yO_{162}, \quad (II)$$

wherein $0 \leq x \leq 3$ and $0 \leq y \leq 3$, M' is at least one rare earth element selected from the group consisting of lanthanum, neodymium, samarium, gadolinium, and yttrium, M" is at least one element selected from aluminum, gallium, chromium, indium, scandium, and ytterbium, and M''' is at least one metal selected from the group consisting of magnesium, zinc, cobalt, and nickel. One or more of the methods of fabricating the dielectric component of the present invention can further comprise adding a binder to the green dielectric particles prior to forming the green dielectric member from the green dielectric particles. In some methods of fabricating the dielectric component of the invention, promoting reaction of the compounds comprises heating the precursor mixture at a first heating rate of less than or equal to about 300° C. per hour to a reaction temperature that is in a range of from about 1,000° C. to about 1,400° C., exposing the precursor mixture to the reaction temperature for a period in a range of between about four hours and about twelve hours to form a first product, and cooling the first product to about room temperature at a first cooling rate in a range of from about 100° C. per hour to about 600° C. per hour to form the green material. In further methods of fabricating the dielectric component of the invention, sintering the green dielectric member to produce the dielectric component comprises heating the green dielectric member at a second heating rate of less than or equal to about 200° C. per hour to a sintering temperature that is in a range of from about 1,300° C. to about 1,500° C., exposing the green dielectric member to the sintering temperature for a sintering period in a range of between about two hours and about eight hours to form a sintered dielectric product, and cooling the sintered dielectric product to about room temperature at a second cooling rate in a range of from about 50° C. per hour to about 200° C. per hour to produce the dielectric component. In still other methods of fabricating the dielectric component of the invention, forming the green dielectric particles into the dielectric member comprises adding a binder to the green dielectric particles, and shaping the green dielectric particles into the dielectric member to a green density that is at least about 50% of the theoretical density of the dielectric material. In some particular embodiments, some of the methods of fabricating the dielectric component of the invention can further comprise machining at least one dimension of the dielectric component into a dielectric resonator having at least one target physical characteristic. One or more further particular methods of fabricating the dielectric material of the invention can involve a maximum target diameter that is less than or equal to 10 microns. The method of fabricating the dielectric component of the invention can further comprise providing the precursor mixture of compounds in target relative stoichiometric amounts to produce the dielectric material having M' as at least one of neodymium and samarium, and M" as aluminum. The method of fabricating the dielectric component of the invention can also or further comprise providing the precursor mixture of compounds in target relative stoichiometric amounts to produce the dielectric material having M' as at least one of neodymium and samarium, and M''' as aluminum.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
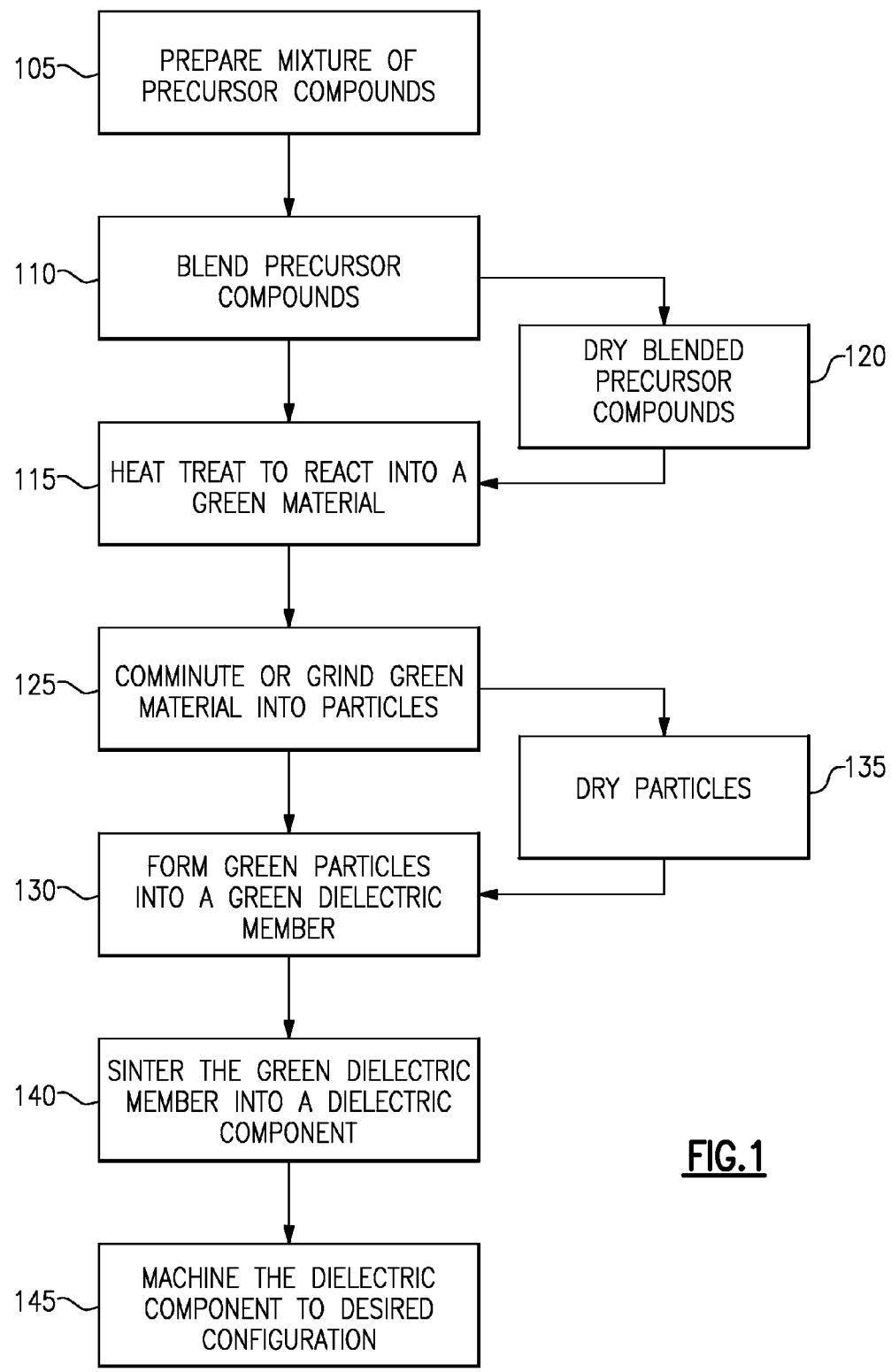
FIG. 1 is a flow chart illustrating a process for preparing a dielectric component comprising a dielectric material in accordance with one or more embodiments of the invention.

One or more aspects of the present invention pertain to dielectric materials, including dielectric ceramic materials that can be used as electronic components in, for example, microwave-based devices. One or more aspects of the invention pertain to methods of synthesis of such materials. Other further aspects of the invention can involve For example, the dielectric materials of the present invention can be directed to tetragonal tungsten bronze dielectric ceramic materials such as barium titanate. One or more further aspects of the invention can pertain incorporating modifying agents to tetragonal tungsten bronze dielectric ceramic materials. For example, some embodiments of the present invention can involve incorporating one or more modifying agents or elements selected from the group consisting of rare earth elements and metals into barium titanates. Non-limiting examples of modifying elements include rare earth elements selected from the group consisting of lanthanum, neodymium, samarium, gadolinium, and yttrium. Other non-limiting examples of modifying elements include germanium, aluminum, gallium, chromium, indium, scandium, ytterbium, magnesium, zinc, nickel, and cobalt. Thus, some aspects of the present invention can involve partial substitution of one or both cationic B' and B'' site atoms by one or more modifying elements in families of dielectric ceramic materials represented by the formula $A_4B'_{10}B''_{18}O_{54}$. Further aspects of the present invention can involve modifying the octahedral tilt of the dielectric ceramic material lattice by incorporating cationic atoms with preferred radii to provide desirable electrophysical characteristics.

Some particular aspects of the invention pertain to the fabrication of such electronic components, or to replacing components or subsystems of systems and apparatus that utilize such materials. For example, one or more aspects of the present invention can be directed to a dielectric ceramic material having a formula:

$$Ba_{12}M'_{(28+a/3)}Ti_{(54-a-b)}M''_aGe_bO_{162},$$

wherein M' is at least one rare earth element selected from the group consisting of lanthanum, neodymium, samarium, gadolinium, and yttrium, M'' is at least one element selected from the group consisting of aluminum, gallium, chromium, indium, scandium, and ytterbium, $0 \leq a \leq 6$, and $0 \leq b \leq 3$. In some embodiments of the invention, b is about 3; and in other embodiments of the invention, b is about 0.1. M' can be at least one of neodymium, samarium, and yttrium, and M'' can be one of aluminum and gallium. In some particular embodiments of the invention, M' is neodymium and samarium, M'' is aluminum, and b is about 0.3. In accordance with one or more typical embodiments of the invention, a+b>0.

One or more aspects of the invention can pertain to a dielectric ceramic material having a formula:

$$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$. In some embodiments pertinent to such aspects of the invention, M' is at least one of neodymium and samarium, and M''' is aluminum. Further embodiments pertinent thereto can involve a material wherein y is about 3 or to a material wherein y is about 0.1. In accordance with one or more typical embodiments of the invention, x+y>0.

Non-limiting embodiments of such materials include $Ba_{12}Nd_{30}Ti_{45}Al_6Ge_3O_{162}$, $Ba_{12}Nd_{18.48}Sm_{10.2}Ti_{51.66}Al_{2.04}Ge_{0.3}O_{162}$, and $Ba_{12}Nd_{18.48}Sm_{10.2}Ti_{51.96}Mg_{1.02}O_{162}$.

One or more aspects of the invention can involve doping or including additives to the modified dielectric ceramic material with one or more doping agents that modify any one of the dielectric properties of the ceramic component, the crystalline morphology or crystal growth characteristic of the bulk body of the dielectric ceramic component, the sintering behavior of the dielectric ceramic material, and the densification behavior of the dielectric ceramic material. For example, one or more metal oxide compounds can be added to a calcined, green dielectric ceramic material prior to forming thereof and prior to sintering of the doped green dielectric ceramic material into a formed dielectric ceramic component. Non-limiting examples of dopants or dopant compounds that can be utilized in the one more embodiments of the present invention include, but are not limited to, manganese oxide and cerium oxide.

One or more further aspects of the invention can involve dielectric compositions having a primary phase comprising the modified dielectric ceramic materials, and one or more additional phases comprising a material that modifies one or more physical properties of the primary dielectric ceramic material. For example, the dielectric composition can have a second phase with a material selected from the group consisting of $BaTi_4O_9$, $Ba_2Ti_9O_{20}$, $TiO_2$, and $Nd_2Ti_2O_7$. The relative amounts of the each of the one or more additional phases can be less than or equal to about 10 wt % of the composition.

One or more compositions of the invention can comprise a dielectric material having a formula, $Ba_{12}M'_{(28+a/3)}Ti_{(54-a-b)}M''_aGe_bO_{162}$, wherein M' is at least one rare earth element selected from the group consisting of lanthanum, neodymium, samarium, gadolinium, and yttrium, M'' is at least one element selected from the group consisting of aluminum, gallium, chromium, indium, scandium, and ytterbium, $0 \leq a \leq 6$, and $0 \leq b \leq 3$; and one or more phases comprising one or more of $BaTi_4O_9$, $Ba_2Ti_9O_{20}$, $TiO_2$, and $Nd_2Ti_2O_7$. Further particular compositions of the present invention can comprise dielectric ceramic material having a formula, $Ba_{12}M'_{(28-2x/3)}Ti_{(54-x-y)}M'''_xGe_yO_{162}$, wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$; and one or more phases comprising one or more of $BaTi_4O_9$, $Ba_2Ti_9O_{20}$, $TiO_2$, and $Nd_2Ti_2O_7$. In accordance with one or more typical embodiments of the invention, a+b>0, or x+y>0.

In particular embodiments of the present invention, the dielectric composition consists essentially of a first phase comprising one or both of a dielectric material having a formula, $$Ba_{12}M'_{(28+a/3)}Ti_{(54-a-b)}M''_aGe_bO_{162},$$

wherein M' is at least one rare earth element selected from the group consisting of lanthanum, neodymium, samarium, gadolinium, and yttrium, M'' is at least one element selected from the group consisting of aluminum, gallium, chromium, indium, scandium, and ytterbium, $0 \leq a \leq 6$, and $0 \leq b \leq 3$, and a dielectric material having a formula, $$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$; and a second phase consisting essentially of a material selected from the group consisting of $BaTi_4O_9$, $Ba_2Ti_9O_{20}$, $TiO_2$, and $Nd_2Ti_2O_7$. In some compositions, the second phase consists essentially of two or more of $BaTi_4O_9$, $Ba_2Ti_9O_{20}$, $TiO_2$, and $Nd_2Ti_2O_7$.

In further particular embodiments of the present invention, the dielectric composition consists essentially of a first phase consisting essentially of a dielectric material having a formula, $$Ba_{12}M'_{(28+a/3)}Ti_{(54-a-b)}M''_aGe_bO_{162},$$

wherein M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$; and a second phase consisting essentially of a material selected from the group consisting of $BaTi_4O_9$, $Ba_2Ti_9O_{20}$, $TiO_2$, and $Nd_2Ti_2O_7$. In typical embodiments of the invention, a+b>0.

In further particular embodiments of the present invention, the dielectric composition consists essentially of a first phase consisting essentially of a dielectric material having a formula, $$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$; and a second phase consisting essentially of a material selected from the group consisting of $BaTi_4O_9$, $Ba_2Ti_9O_{20}$, $TiO_2$, and $Nd_2Ti_2O_7$. In typical embodiments of the invention, x+y>0.

In still further particular embodiments of the present invention, the dielectric composition consists of a first phase of a dielectric material having a formula, $$Ba_{12}M'_{(28+a/3)}Ti_{(54-a-b)}M''_aGe_bO_{162},$$

wherein M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$, or a dielectric material having a formula, $$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$; and a second phase consisting essentially of a material selected from the group consisting of $BaTi_4O_9$, $Ba_2Ti_9O_{20}$, $TiO_2$, and $Nd_2Ti_2O_7$. In accordance with one or more typical embodiments of the invention, a+b>0, or x+y>0.

The second phase can consist of one of $BaTi_4O_9$, $Ba_2Ti_9O_{20}$, $TiO_2$, and $Nd_2Ti_2O_7$. In some compositions, the second phase consists essentially of two or more of $BaTi_4O_9$, $Ba_2Ti_9O_{20}$, $TiO_2$, and $Nd_2Ti_2O_7$.

One or more aspects of the present invention can also pertain to methods of fabricating a dielectric component. One or more of the methods can comprise blending a precursor mixture of compounds comprising a barium source, a titanium source, at least one rare earth element source, and at least one metal source; promoting reaction of the compounds to from a green material; comminuting the green material into green dielectric particles having a maximum target diameter; forming a green dielectric member from the green dielectric particles; sintering the green dielectric member to produce the dielectric component comprising a dielectric ceramic material having a formula:

$$Ba_{12}M'_{(28+a/3)}Ti_{(54-a-b)}M''_aGe_bO_{162}, \qquad (I)$$

wherein $0 \leq a \leq 6$ and $0 \leq b \leq 3$, M' is at least one rare earth element selected from the group consisting of lanthanum, neodymium, samarium, gadolinium, and yttrium, M" is at least one element selected from aluminum, gallium, chromium, indium, scandium, and ytterbium. In other embodiments of the methods of the invention, the dielectric ceramic material can have a formula:

$$Ba_{12}M'_{(28+2x/3)}Ti_{(54-x-y)}M'''_xGe_yO_{162}, \qquad (II)$$

wherein $0 \leq x \leq 3$ and $0 \leq y \leq 3$, M' is at least one rare earth element selected from the group consisting of lanthanum, neodymium, samarium, gadolinium, and yttrium, M" is at least one element selected from aluminum, gallium, chromium, indium, scandium, and ytterbium, and M''' is at least one metal selected from the group consisting of magnesium, zinc, cobalt, and nickel. In typical embodiments of the invention, a+b>0 or x+y>0. One or more of the methods fabricating the dielectric component of the present invention can further comprise adding a binder to the green dielectric particles prior to forming the green dielectric member from the green dielectric particles. In some methods of fabricating the dielectric component of the invention, promoting reaction of the compounds comprises heating the precursor mixture at a first heating rate of less than or equal to about 300° C. per hour to a reaction temperature that is in a range of from about 1,000° C. to about 1,400° C., exposing the precursor mixture to the reaction temperature for a period in a range of between about four hours and about twelve hours to form a first product, and cooling the first product to about room temperature at a first cooling rate in a range of from about 100° C. per hour to about 600° C. per hour to form the green material.

In accordance with further methods of fabricating the dielectric component of the invention, sintering the green dielectric member to produce the dielectric component comprises heating the green dielectric member at a second heating rate of less than or equal to about 200° C. per hour to a sintering temperature that is in a range of from about 1,300° C. to about 1,500° C., exposing the green dielectric member to the sintering temperature for a sintering period in a range of from about two hours to about eight hours to form a sintered dielectric article, and cooling the sintered dielectric article to about room temperature at a second cooling rate in a range of from about 50° C. per hour to about 200° C. per hour to produce the dielectric component.

In accordance with other methods of fabricating the dielectric component of the invention, forming the green dielectric particles into the dielectric member comprises adding a binder to the green dielectric particles, and shaping the green dielectric particles into the dielectric member to a green density that is at least about 50% of the theoretical density of the dielectric ceramic material. In some particular embodiments, some of the methods of fabricating the dielectric component of the invention can further comprise machining at least one dimension of the dielectric component into a dielectric resonator having at least one target physical characteristic.

One or more further particular methods of fabricating the dielectric components of the invention can involve particles having a maximum target diameter that is less than or equal to 10 microns. The method of fabricating the dielectric component of the invention can further comprise providing the precursor mixture of compounds in target relative stoichiometric amounts to produce the dielectric ceramic material having M' as at least one of neodymium and samarium, and M" as aluminum. The method of fabricating the dielectric component of the invention can also or further comprise providing the precursor mixture of compounds in target relative stoichiometric amounts to produce the dielectric ceramic material having M' as at least one of neodymium and samarium, and M''' as aluminum.

For example, the fabrication process, as exemplarily illustrated in FIG. 1, typically involves providing or preparing 105 a mixture of precursor compounds. Each of the precursor or element donor compounds can be an oxide or a carbonate, such as but not limited to $BaCO_3$, $TiO_2$, $Nd_2O_3$, $Al_2O_3$, $ZnO$, MgO, $MnO_2$, $Sm_2O_3$, and $GeO_2$. The relative amounts of the precursor compounds can be provided to result in a dielectric ceramic composition with a single primary phase, without additional phases that affect any of the physical properties of the primary phase or, in some embodiments of the invention, with a primary phase and one or more secondary phases. For example, stoichiometric amounts of the precursor compounds can comprise the mixture to result in a dielectric ceramic composition of any one of $Ba_{12}Nd_{30}Ti_{45}Al_6Ge_3O_{162}$, $Ba_{12}Nd_{18.48}Sm_{10.2}Ti_{51.66}Al_{2.04}Ge_{0.3}O_{162}$, and $Ba_{12}Nd_{18.48}Sm_{10.2}Ti_{51.96}Mg_{1.02}Ge_{1.02}O_{162}$. Embodiments with an additional phase, which can be present between the primary phase grains, can be implemented by incorporating greater than stoichiometric amounts of each of the one or more corresponding precursor compounds in the mixture.

The mixture of precursor compounds is then typically dry or wet blended 110 until the mixture is homogeneous. Blending can be performed by any one or more of propeller mixing, ball milling, and vibratory milling.

If wet blending is utilized, the wet blended mixture is typically dried 120 by spray drying or by pan drying. Drying can be performed until the mixture has a desired viscosity or slump characteristics. For example, drying can be performed until the resultant mixture no longer behaves as a slurry. Although drying is preferred when wet blending is implemented, water or the blending agent may still constitute greater than 75 wt % of the mixture to be reacted. Drying can be performed by pan drying the mixture at a temperature that vaporizes the liquid agent, e.g., at a temperature in a range of about 50° C. to about 300° C., such as at about 200° C.

Reaction of the precursor compounds into the tetragonal tungsten bronze dielectric ceramic material can be promoted by calcining, heating, or heat-treating 115 the blended mixture in an oven. Heating can involve raising the oven temperature at a rate in a range of from about 5° C. per hour to about 300° C. per hour to one or more heat soaking periods. Preferably, the heating ramp rate is in a range of between 50° C. per hour to about 150° C. per hour. The one or more heat soaking periods can be performed at an oven temperature in a range of between 1,000° C. to about 1,400° C. The preferred heat soaking temperature can vary depending on, for example, the composition of the dielectric ceramic material product and, in some cases, the type of precursor compound. A non-limiting preferred heat soaking temperature is in a range of between 1,100° C. and about 1,300° C. Heat soaking temperatures below about 1,000° C. may not sufficiently promote reaction into the dielectric structure, which can result in unreacted phases in the composition. Heat soaking temperatures above about 1,400° C. may promote melting, at least partially, of the barium titanate lattice structure, which can result in incomplete incorporation of the modifying elements in the tetragonal tungsten bronze lattice. Heat-treating at the heat soaking temperature can be performed until the reaction has sufficiently progressed to form the dielectric ceramic material. For example, heat soaking can be performed for a period in a range of from about two hours to about sixteen hours, preferably in a range of between four hours and about twelve hours, more preferably for about eight hours. The duration of the heat soaking or calcining period may depend on the composition of the dielectric ceramic material, and, in some cases, the relative compositions of the modifiers in the material. Depending on, for example, the dielectric ceramic material product, calcining periods of less than about four hours may not sufficiently react or convert the precursor compounds into green material reaction product. Further, heat-treating can involve cooling the material that has at least partially reacted into a green material to about room temperature, typically about 20° C. to about 25° C. Cooling can be performed at a rate in a range of from about 5° C. per hour to about 600° C. per hour. For example, cooling can be performed by reducing the temperature of the oven containing the green material at a rate of about 100° C. per hour.

The green material is typically milled, ground, or comminuted 125 to particles with a target dimension or diameter by ball milling or vibratory milling with, for example, 5 mm diameter balls of yttria-stabilized zirconia, magnesia-stabilized zirconia, and/or ceria-stabilized zirconia. Water or an inert carrier fluid, such as acetone, can be utilized to facilitate milling. The target dimension can be a maximum dimension. For example, milling can be performed until the particles have an effective or nominal diameter of less than about 10 microns. In further embodiments of the invention, the target dimension can be an average effective diameter. For example, milling can be performed to provide particles with an average diameter in a range of from about 2 microns to about 6 microns. If advantageous to do so, particles with less than a predetermined threshold dimension, or diameter, can be separated by, for example, sieving. For example, particles with an average effective diameter of less than about one micron may be segregated. The particles of the dielectric ceramic material can be spherically shaped or substantially spherically shaped. However, one or more aspects of the present invention can be practiced with other shapes. Indeed, some embodiments of the present invention contemplate an aggregation of particles having differing shape or size characteristics, or both. For substantially spherical particles, the nominal diameter can be considered as the equivalent diameter of a hypothetical sphere having the same volume as the particle. Thus, the average nominal diameter can be considered an average equivalent diameter of hypothetical spherical particles having the same volume.

The comminuted green particles can then be formed 130 into a green dielectric member. However, if wet milling is utilized, the wet comminuted particles are typically dried 135 by, for example, spray drying or pan drying, prior to forming the green dielectric member. As in drying the mixture of precursor materials, drying 135 of the green particles can be performed to a target moisture level. For example, drying can be performed until the aggregation of particles has a moisture content of less than about 50 wt %. Drying can be performed by pan drying at a temperature that vaporizes the liquid component, e.g., at at least about 50° C., such as at about 200° C.

Forming 130 can be accomplished by any of pressing, such as hot isostatic pressing with an inert gas, and extrusion, or by hand die pressing.

A binder, at for example about less than 2 wt %, may be added to the green particles to facilitate forming the green member. The amount of binder may vary depending on, for example, the type of binder and the physical characteristics of the particles, such as, but not limited to particle size and the granularity of the particles. Too much binder, however, may affect the density of the component or create pockets in the component. A non-limiting example of a binder that can be used is polyvinyl alcohol. To further facilitate the forming procedure, one or more plasticizers, such as polyethylene glycol, may be utilized with the binder. The amount of the plasticizer utilized may similarly be dependent on the type of binder and the physical characteristics of the particles.

Shaping or forming the particles into a desired shape can be effected to provide a shaped article having a density that is at least about 50% of the theoretical density of the final dielectric ceramic material. For example, the particles can be pressed at a pressure of at least about 2,000 psi, for example, at about 40,000 psi, which would typically provide formed green dielectric members having a density that is at least about 55%, typically between about 55% and about 65%, of the theoretical density of the dielectric ceramic material.

One or more dopant compounds may be added to the particles prior to comminuting 125 the green material or prior to forming 130 the green dielectric member, or both. Preferably, adding the one or more dopant compounds involves, for example, mixing such dopant compounds with the green material and then comminuting the mixture thereof. However, mixing the one or more dopant compounds may also involve mixing with the particles having the maximum threshold dimension. The amounts of each of the one or more the dopant compounds added typically correspond to on a target level relative to the weight of the dielectric ceramic material.

As noted, in embodiments comprising one or more phases, material of the second phase may be added to the green material. As with the one or more dopant compounds, the one or more second phase precursor compounds may be added prior to grinding or comminution of the green material.

The green dielectric member, which can optionally have the one or more second phase precursor compounds and the one or more dopant compounds, can be sintered 140 into a dielectric component. Sintering can be performed in an oxygen-containing atmosphere for a period and at a temperature, or for a plurality of durations and the same or at various temperatures to effect densification of the material and, in some cases, to complete the solids state reaction. Some embodiments of the invention can involve sintering to provide particular material characteristics. For example, sintering can be performed at one or more conditions that provide preferred grain characteristics. Sintering can be performed by heating or exposing the green member to conditions, with a particular heating rate, to one or more sintering temperatures. The shape and geometry of the member and its physical properties may affect the effective heat transfer behavior of the member. Thus, for example, the heating rate can depend on the shape of the member and the thermal conductivity of the material. In non-limiting embodiments of the invention, heating can be performed at a rate that is in a range of from about 50° C. per hour to about 200° C. per hour. The shape and composition of the material may also influence the duration of the sintering temperature. Thus, depending on at least such factors, one or more sintering temperatures may be utilized and the one or more durations of exposure at such temperature, or at a plurality of temperatures, can be in a range of from about 1,300° C. to about 1,500° C. The sintering duration at the one or more temperatures can be performed for corresponding sintering durations that is in a range of from about one hour to about ten hours, preferably, in a range of about three to about eight hours. Sintering typically further involves cooling the dielectric ceramic material at one or more suitable cooling conditions. For example, cooling can involve reducing the temperature of the dielectric ceramic material, or the environment thereof, to about room temperature of about 25° C., at a rate in a range of from about 100° C. per hour to about 300° C. per hour. Like the heating rate, the cooling rate can also advantageously be performed in stages or steps. Such embodiments of the invention may be appropriate to avoid or reduce the likelihood of fracturing or cracking of the dielectric ceramic component because of thermal shock. For example, a preferred cooling rate, which can depend on considerations such as the geometrical configuration, the thermal conductivity, and the coefficient of thermal expansion of the material, can be performed at a rate of about 150° C. per hour. Sintering can thus provide a component that has a density, such as a target density, of at least about 95% of the theoretical density of the dielectric ceramic material.

The dielectric component may then be finished or machined 145 to have desirable features or dimensions or to remove undesirable portions created during the formation process. For example, machining can involve creating one or more apertures in the body of the component.

One ore more further aspects of the invention can be directed to repairing or modifying electronic apparatus to incorporate any one or more of the dielectric ceramic materials of the present invention. For example, the present invention can be directed to removing a ceramic resonator of an electronic apparatus and retrofitting or installing therefor a replacement resonator comprising a ceramic dielectric material having a formula,

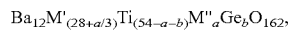

$$Ba_{12}M'_{(28+a/3)}Ti_{(54-a-b)}M''_aGe_bO_{162},$$

wherein M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$, or a dielectric material having a formula,

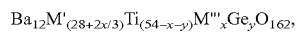

$$Ba_{12}M'_{(28+2x/3)}Ti_{(54-x-y)}M'''_xGe_yO_{162},$$

wherein M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$; and a second phase consisting essentially of a material selected from the group consisting of $BaTi_4O_9$, $Ba_2Ti_9O_{20}$, $TiO_2$, and $Nd_2Ti_2O_7$. The method can further comprise modifying the other components or subsystems of the apparatus to incorporate one or more dielectric properties of the ceramic dielectric material of the replacement resonator. In typical embodiments of the invention, $a+b>0$ or $x+y>0$.

EXAMPLES

The function and advantages of these and other embodiments of the invention can be further understood from the examples below, which illustrate the benefits and/or advantages of the one or more systems and techniques of the invention but do not exemplify the full scope of the invention.

In Example 1, the following test protocols were utilized to determine the dielectric constant, the Q factor, and the temperature coefficient of resonant frequency for a dielectric resonator (DR) comprising the respective material compositions.

A puck-shaped dielectric resonator is bounded by metallic walls at its two flat faces.

The density of the dielectric resonator was determined by the Archimedes method.

Figure 2:
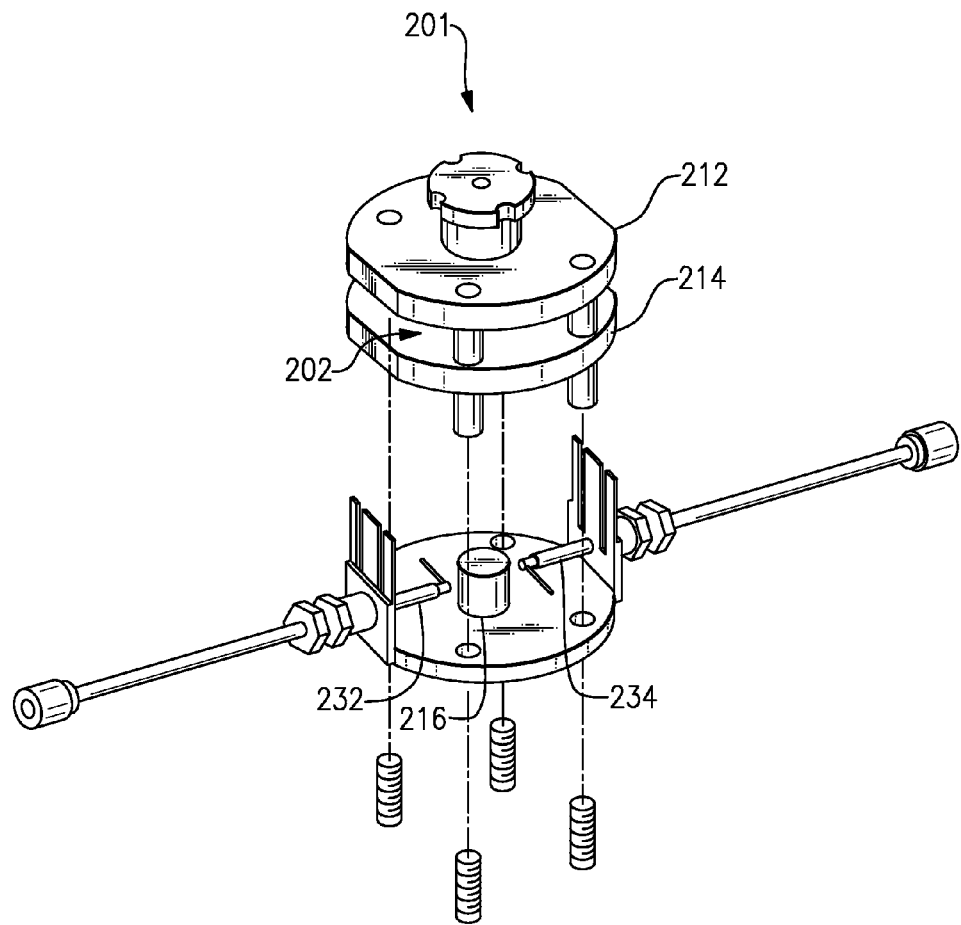
FIG. 2 is schematic illustration of a test fixture used to measure dielectric properties of a dielectric resonator in accordance with one or more embodiments of the invention.

The dielectric constant is determined based on the specimen dimensions and the resonant frequency as measured on a network analyzer, such as one from the PNA series of network analyzers from Agilent Technologies, Inc., Santa Clara, Calif. FIG. 2 illustrates a holder 201 used as a test fixture in the Courtney parallel plate method for the dielectric measurements of the various puck shaped specimens 202 in the examples. Q-factor, or unloaded $Q_u$, was measured in the test cavity whose dimensions are at least three times the size of the dielectric resonator specimen. Each of the DR specimens 202 were placed between metallic walls 212 and 214. A low loss quartz support members 216 were utilized to suspend each of the specimens 202 away from the influence of metallic walls 212 and 214. Coupling loops or RF probes 232 and 234 are operatively connected to the network analyzer (not shown). The degree of coupling was adjusted such that the transmission loss was about −40 dB.

Using the measured 3 dB bandwidth (BW), the Q-factor, $Q_u$, was determined using the relationship:

$$Q_u = \frac{\frac{F_0}{BW}}{1 - 10^{\frac{IL}{20}}}$$

where IL is the loss, and $F_0$ is the center frequency (in MHz).

The test is performed at laboratory ambient conditions, and the resonance measured for the $TE_{01\delta}$ mode.

The temperature coefficient of resonant frequency, $\tau_f$, is measured in a simulated isolated DR condition, similar to that described for Q-factor above except that the $TE_{01\delta}$ mode is observed in a reflection mode with the network analyzer. The entire test cavity and each DR specimen were placed in a temperature chamber, and the frequency of the resonance was measured at 25° C. and at 60° C. $\tau_f$ (in ppm/° C.) was determined using the relationship:

$$\tau_f = \frac{\Delta F}{F_0} \times \frac{1}{\Delta T}$$

where F (in Hz) is the difference between the resonant frequency at 60° C. and the resonant frequency at 25° C., $F_0$ (in MHz) is the resonant frequency at 25° C., and Δ=60° C.−25° C.=35° C.

The dielectric resonator frequency, $F_0$ (in GHz), in the $TE_{01\delta}$ mode was approximately determined using the relationship:

$$F_0 = \frac{8.553}{\sqrt{\varepsilon_r}} \frac{1}{\sqrt[3]{\frac{\pi}{4} D_r^2 L_r}}$$

where $D_r$ (in inches) is the resonator diameter, Lr (in inches) is the resonator length, and $\varepsilon_r$ is the dielectric constant of the resonator.

Example 1

Each of the various ceramic dielectric materials in accordance with the present invention were prepared by aqueous mill blending in polypropylene jars with yttria-stabilized zirconia media for about one hour. The blended samples then dried by exposure to a temperature of about 200° C., and then sieved through a 10 mesh sieve.

The sieved material was then calcined in air in an oven at a temperature of about 1,150° C. X-ray diffraction review was performed to verify phase purity.

The calcined material was then aqueously milled to a particle size that is in the range of about one micron to about ten microns and then pan dried at a temperature of about 200° C.

A binder of about 80% polyvinyl alcohol and about 20% polyethylene glycol was added to the each of the various samples, at about 1 wt %. The mixture was then blended until homogeneous.

The homogeneous blend of green material was uniaxially pressed at about 2,000 psi and heat-treated at about 1,400° C. to produce the various resonator specimens.

The corresponding physical properties of tetragonal tungsten bronze dielectric ceramic materials of the present invention are presented in Tables 1-4, as measured using the described protocols.

Table 1 lists physical properties of dielectric ceramic materials having any one or more of neodymium, samarium and aluminum in the tetragonal tungsten bronze lattice of the barium titanate, in the in accordance with one or more aspects of the present invention. Table 1 also lists physical properties of a composite material including doped barium titanate and one or more secondary oxides in accordance with further aspects of the present invention.

Table 2 lists physical properties of dielectric ceramic materials having any one or more of neodymium, samarium, yttrium, gallium, and aluminum in the tetragonal tungsten bronze lattice of the barium titanate, in accordance with one or more aspects of the present invention.

Table 3 lists physical properties of ceramic materials including germanium and any one or more of neodymium, samarium, yttrium, magnesium, zinc, and aluminum in the tetragonal tungsten bronze lattice of the barium titanate, in accordance with one or more aspects of the present invention.

Table 4 lists physical properties of ceramic materials including any one or more of neodymium, samarium, aluminum, magnesium, cobalt, nickel, gallium, scandium, chromium, indium, zinc, and aluminum in the tetragonal tungsten bronze lattice of the barium titanate, in accordance with one or more aspects of the present invention.

Table 5 lists the temperature coefficient of resonant frequency, $\tau_f$, for some of the material compositions of the present invention.

TABLE 1

| Composition | Density | Dielectric Constant | Q | Resonant Frequency GHz | Quality Factor Q · f |
|---|---|---|---|---|---|
| $Ba_{12}Nd_{18.48}Sm_{10.2}Ti_{51.96}Al_{2.04}O_{162}$ (fast cool) | 5.77 | 76.75 | 5095 | 3.0059 | 15315 |
| $Ba_{12}Nd_{18.48}Sm_{10.2}Ti_{51.96}Al_{2.04}O_{162}$ | 5.78 | 75.81 | 5329 | 2.98429 | 15903 |
| $Ba_{12}Nd_{18.48}Sm_{10.2}Ti_{51.96}Al_{2.04}O_{162}$ + 0.05 wt % $MnO_2$ | 5.77 | 76.18 | 3179 | 2.9886 | 9501 |
| $Ba_{12}Nd_{18.48}Sm_{10.2}Ti_{51.96}Al_{2.04}O_{162}$ + 0.075 wt % $MnO_2$ | 5.8 | 76.19 | 3170 | 2.98026 | 9447 |
| $Ba_{12}Nd_{18.48}Sm_{10.2}Ti_{51.96}Al_{2.04}O_{162}$ + 0.1 wt % $MnO_2$ | 5.79 | 76.33 | 5744 | 2.98684 | 17156 |
| $Ba_{12}Nd_{18.48}Sm_{10.2}Ti_{51.96}Al_{2.04}O_{162}$ + 0.125 wt % $MnO_2$ | 5.79 | 75.92 | 3314 | 2.98334 | 9887 |
| $Ba_{12}Nd_{18.48}Sm_{10.2}Ti_{51.96}Al_{2.04}O_{162}$ + 0.05 wt % $CeO_2$ | 5.79 | 76.09 | 5146 | 2.98432 | 15357 |

TABLE 1-continued

| Composition | Density | Dielectric Constant | Q | Resonant Frequency GHz | Quality Factor Q·f |
|---|---|---|---|---|---|
| $Ba_{12}Nd_{18.48}Sm_{10.2}Ti_{51.96}Al_{2.04}O_{162}$ + 0.075 wt % $CeO_2$ | 5.78 | 76.09 | 5237 | 2.98484 | 15632 |
| $Ba_{12}Nd_{18.48}Sm_{10.2}Ti_{51.96}Al_{2.04}O_{162}$ + 0.1 wt % $CeO_2$ | 5.79 | 75.86 | 5237 | 2.98489 | 15632 |
| $Ba_{12}Nd_{18.48}Sm_{10.2}Ti_{51.96}Al_{2.04}O_{162}$ + 0.125 wt % $CeO_2$ | 5.77 | 76.2 | 3414 | 3.00436 | 10257 |
| $Ba_{12}Nd_{18.48}Sm_{10.2}Ti_{51.96}Al_{2.04}O_{162}$ + 0.05 wt % $MnO_2$ + 0.05 wt % $CeO_2$ | 5.79 | 76.04 | 5860 | 2.98842 | 17512 |
| $Ba_{12}Nd_{18.48}Sm_{10.2}Ti_{51.96}Al_{2.04}O_{162}$ + 0.1 wt % $MnO_2$ + 0.1 wt % $CeO_2$ | 5.79 | 76.2 | 3175 | 2.98525 | 9478 |
| $Ba_{12}Nd_{18.48}Sm_{10.2}Ti_{51.96}Al_{2.04}O_{162}$ + 0.1 wt % $MnO_2$ + 0.05 wt % $CeO_2$ | 5.79 | 76.16 | 3350 | 2.98193 | 9989 |
| $Ba_{12}Nd_{18.48}Sm_{10.2}Ti_{51.96}Al_{2.04}O_{162}$ | 5.78 | 75.26 | 4985 | 2.99076 | 14909 |

TABLE 2

| Composition | Density | Dielectric Constant | Q | Resonant Frequency GHz | Quality Factor Q·f |
|---|---|---|---|---|---|
| $Ba_{12}Nd_{18.48}Sm_{10.2}Ti_{51.96}Ga_{2.04}O_{162}$ | 5.71 | 73.91 | 4506 | 3.01883 | 13603 |
| $Ba_{12}Nd_{18.48}Sm_{10.2}Ti_{51.96}Al_{1.02}Ga_{1.02}O_{162}$ | 5.75 | 74.64 | 4557 | 3.00741 | 13705 |
| $Ba_{12}Nd_{22.8}Y_6Ti_{51.6}Al_{2.4}O_{162}$ | 5.61 | 73.06 | 1171 | 3.03335 | 3552 |
| $Ba_{12}Nd_{24}Y_{4.8}Ti_{51.6}Al_{2.4}O_{162}$ | 5.64 | 72.7 | 1551 | 3.03999 | 4715 |
| $Ba_{12}Nd_{25.2}Y_{3.6}Ti_{51.6}Al_{2.4}O_{162}$ | 5.66 | 74.35 | 2617 | 3.0096 | 7876 |
| $Ba_{12}Nd_{14.7}Sm_{8.1}Y_6Ti_{51.6}Al_{2.4}O_{162}$ | 5.52 | 68.74 | 639 | 3.13906 | 2006 |
| $Ba_{12}Nd_{15.48}Sm_{8.52}Y_{4.8}Ti_{51.6}Al_{2.4}O_{162}$ | 5.69 | 72.05 | 1117 | 3.0519 | 3409 |
| $Ba_{12}Nd_{16.239}Sm_{8.961}Y_{3.6}Ti_{51.6}Al_{2.4}O_{162}$ | 5.66 | 71.81 | 1168 | 3.04936 | 3562 |
| $Ba_{12}Nd_{17.01}Sm_{9.39}Y_{2.4}Ti_{51.6}Al_{2.4}O_{162}$ | 5.75 | 73.23 | 2750 | 3.02552 | 8320 |
| $Ba_{12}Nd_{14.61}Sm_{8.07}Y_6Ti_{51.96}Al_{2.04}O_{162}$ | 5.61 | 70.88 | 2954 | 3.0724 | 9076 |
| $Ba_{12}Nd_{14.64}Sm_{8.1}Ti_{51.78}Al_{2.22}Y_6O_{162}$ | 5.63 | 70.48 | 958 | 3.0848 | 2955 |
| $Ba_{12}Nd_{16.92}Sm_{9.36}Y_{2.4}Ti_{51.96}Al_{2.04}O_{162}$ | 5.48 | 70.5 | 894 | 3.09346 | 2766 |
| $Ba_{12}Nd_{16.965}Sm_{9.375}Y_{2.4}Ti_{51.78}Al_{2.22}O_{162}$ | 5.68 | 73.28 | 1177 | 3.04821 | 3588 |

TABLE 3

| Composition | Density | Dielectric Constant | Q | Resonant Frequency GHz | Quality Factor Q·f |
|---|---|---|---|---|---|
| $Ba_{12}Nd_{28}Ti_{51}Ge_3O_{162}$ | 5.7 | 76.6 | 2561 | 2.9197 | 7477 |
| $Ba_{12}Nd_{30}Ti_{45}Al_6Ge_3O_{162}$ | 5.81 | 51.96 | 3006 | 3.367 | 10121 |
| $Ba_{12}Nd_{26.4}Y_{2.4}Ti_{51.3}Al_{2.4}Ge_{0.3}O_{162}$ | 5.65 | 62.85 | 1199 | 3.28403 | 3938 |
| $Ba_{12}Nd_{18.48}Sm_{10.2}Ti_{51.66}Al_{2.04}Ge_{0.3}O_{162}$ | 5.8 | 75.31 | 4621 | 3.00352 | 13879 |
| $Ba_{12}Nd_{18.48}Sm_{10.2}Ti_{51.96}Mg_{1.02}Ge_{1.02}O_{162}$ | 5.79 | 76.51 | 4198 | 2.98 | 12510 |
| $Ba_{12}Nd_{18.48}Sm_{10.2}Ti_{51.96}Zn_{1.02}Ge_{1.02}O_{162}$ | 5.82 | 76.87 | 2828 | 2.96893 | 8396 |
| $Ba_{12}Nd_{18.48}Sm_{10.2}Ti_{51.66}Al_{2.04}Ge_{0.3}O_{162}$ + 0.05 wt % $MnO_2$ | 5.79 | 74.36 | 3126 | 3.00143 | 9382 |
| $Ba_{12}Nd_{18.48}Sm_{10.2}Ti_{51.66}Al_{2.04}Ge_{0.3}O_{162}$ + 0.10 wt % $MnO_2$ | 5.78 | 74.9 | 3066 | 3.00538 | 9214 |
| $Ba_{12}Nd_{18.48}Sm_{10.2}Ti_{51.72}Al_{2.04}Ge_{0.24}O_{162}$ | 5.78 | 75.04 | 3093 | 3.00078 | 9281 |
| $Ba_{12}Nd_{18.48}Sm_{10.2}Ti_{51.78}Al_{2.04}Ge_{0.18}O_{162}$ | 5.78 | 75.33 | 3256 | 2.99623 | 9756 |
| $Ba_{12}Nd_{18.48}Sm_{10.2}Ti_{51.84}Al_{2.04}Ge_{0.12}O_{162}$ | 5.79 | 76.87 | 3293 | 2.99696 | 9869 |
| $Ba_{12}Nd_{18.48}Sm_{10.2}Ti_{51.9}Al_{2.04}Ge_{0.06}O_{162}$ | 5.78 | 75.49 | 3211 | 2.98708 | 9592 |
| $Ba_{12}Nd_{18.48}Sm_{10.2}Ti_{51.51}Al_{2.04}Ge_{0.45}O_{162}$ | 5.79 | 74.28 | 2916 | 3.00355 | 8758 |
| $Ba_{12}Nd_{18.48}Sm_{10.2}Ti_{51.36}Al_{2.04}Ge_{0.6}O_{162}$ | 5.78 | 74.66 | 2954 | 3.01381 | 8903 |
| $Ba_{12}Nd_{18.48}Sm_{10.2}Ti_{51.21}Al_{2.04}Ge_{0.75}O_{162}$ | 5.79 | 74.5 | 3073 | 3.01242 | 9257 |
| $Ba_{12}Nd_{18.48}Sm_{10.2}Ti_{51.06}Al_{2.04}Ge_{0.9}O_{162}$ | 5.79 | 74.27 | 2931 | 3.01935 | 8850 |
| $Ba_{12}Nd_{18.48}Sm_{10.2}Ti_{50.76}Al_{2.04}Ge_{1.2}O_{162}$ | 5.8 | 73.81 | 2997 | 3.02737 | 9073 |
| $Ba_{12}Nd_{18.48}Sm_{10.2}Ti_{50.46}Al_{2.04}Ge_{1.5}O_{162}$ | 5.79 | 73.43 | 2891 | 3.03625 | 8778 |

TABLE 4

| Composition | Density | Dielectric Constant | Q | Resonant Frequency GHz | Quality Factor Q·f |
|---|---|---|---|---|---|
| $Ba_{12}Nd_{18.48}Sm_{10.2}Ti_{51.96}Al_{2.04}O_{162}$ | 5.74 | 75.7 | 3139 | 2.98298 | 9364 |
| $Ba_{12}Nd_{18.48}Sm_{10.2}Ti_{51.96}Al_{2.04}O_{162}$ | 5.78 | 75.26 | 4985 | 2.99076 | 14909 |
| $Ba_{12}Nd_{18.48}Sm_{10.2}Ti_{51.96}Ga_{2.04}O_{162}$ | 5.71 | 73.91 | 4506 | 3.01883 | 13603 |
| $Ba_{12}Nd_{18.48}Sm_{10.2}Ti_{51.96}Al_{1.02}Ga_{1.02}O_{162}$ | 5.75 | 74.64 | 4557 | 3.00741 | 13705 |
| $Ba_{12}Nd_{18.48}Sm_{10.2}Ti_{51.96}Cr_{2.04}O_{162}$ | 5.77 | 75.04 | 3740 | 2.9917 | 11189 |
| $Ba_{12}Nd_{18.48}Sm_{10.2}Ti_{51.96}In_{2.04}O_{162}$ | 5.77 | 72.57 | 1585 | 3.04246 | 4822 |
| $Ba_{12}Nd_{18.48}Sm_{10.2}Ti_{51.96}Sc_{2.04}O_{162}$ | 5.65 | 71.36 | 3010 | 3.07026 | 9241 |
| $Ba_{12}Nd_{18.48}Sm_{10.2}Ti_{51.96}Yb_{2.04}O_{162}$ | 5.65 | 68.06 | 2601 | 3.14698 | 8185 |
| $Ba_{12}Sm_{30}Ti_{51}Zn_{3}O_{162}$ | 5.98 | 68.2 | 542 | 3.148 | 1706 |
| $Ba_{12}Sm_{30}Ti_{51}Mg_{3}O_{162}$ | 5.34 | 55.25 | 1903 | 3.54 | 6736 |
| $Ba_{12}Sm_{30}Ti_{51}Co_{3}O_{162}$ | 5.64 | 63.37 | 877 | 3.263 | 2862 |
| $Ba_{12}Sm_{30}Ti_{48}Ga_{6}O_{162}$ | 5.8 | 59 | 3073 | 3.38 | 10387 |
| $Ba_{12}Sm_{30}Ti_{51}Ni_{3}O_{162}$ | 5.31 | 57.85 | 783 | 3.414 | 2673 |
| $Ba_{12}Sm_{30}Ti_{48}Al_{6}O_{162}$ | 5.55 | 53.81 | 4536 | 3.584 | 16257 |

TABLE 5

| Composition | Temperature Coefficient of Resonant Frequency $\tau_f$ |
|---|---|
| $Ba_{12}Sm_{30}Ti_{48}Ga_{6}O_{162}$ | −78.05 |
| $Ba_{12}Sm_{30}Ti_{48}Al_{6}O_{162}$ | −64.86 |
| $Ba_{12}Nd_{24}Sm_{6}Ti_{48}Al_{6}O_{162}$ | −5.21 |
| $Ba_{12}Nd_{24}Y_{6}Ti_{48}Al_{6}O_{162}$ | −34.99 |
| $Ba_{12}Nd_{30}Ti_{48}Al_{6}O_{162}$ | 9.62 |
| $Ba_{12}Nd_{18.48}Sm_{10.2}Ti_{51.66}Al_{2.04}Ge_{0.3}O_{162}$ + 0.10 wt % $MnO_2$ | −2.32 |
| $Ba_{12}Nd_{18.48}Sm_{10.2}Ti_{51.51}Al_{2.04}Ge_{0.45}O_{162}$ | −2.63 |
| $Ba_{12}Nd_{18.48}Sm_{10.2}Ti_{51.21}Al_{2.04}Ge_{0.75}O_{162}$ | −2.99 |
| $Ba_{12}Nd_{18.48}Sm_{10.2}Ti_{50.46}Al_{2.04}Ge_{1.5}O_{162}$ | −3.42 |

Example 2

This example considers the influence of the atomic radius of substituting atoms on the dielectric properties.

Table 6 lists the Shannon-Prewitt radii (in Å) of various M' substituting atoms utilized in $Ba_{12}M'_{30}Ti_{54}O_{162}$ materials in Example 1, in accordance with one or more aspects of the present invention.

Table 7 lists the Shannon-Prewitt radii (in Å) of various M'' or M''' substituting atoms utilized in $Ba_{12}M'_{30}Ti_{(54-z)}(M''$ or $M''')_zO_{162}$ materials in Example 1, in accordance with one or more aspects of the present invention.

Figure 3A:
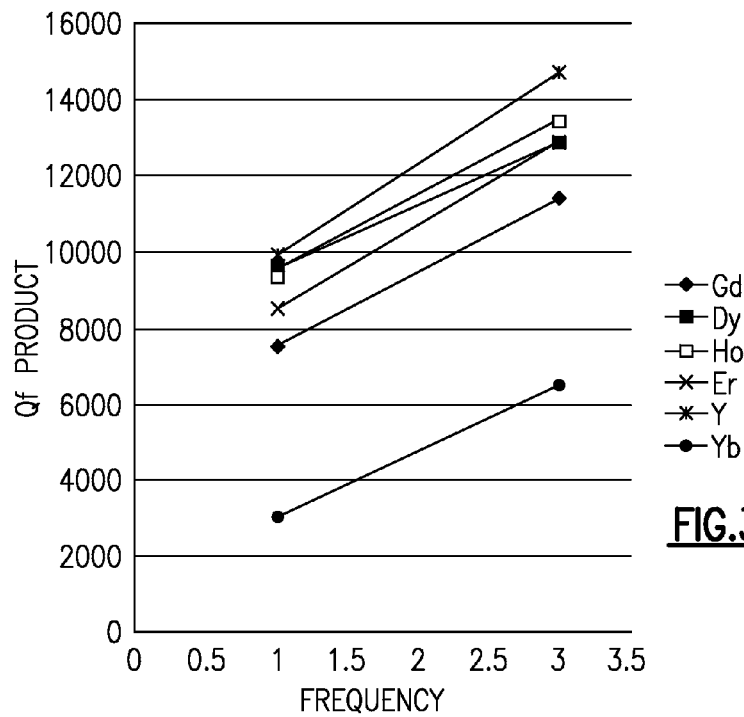
FIGS. 3A and 3B are graphs showing the effect of ionic size of the substituting atom M' on the frequency dependence and on Q·f for a $Ba_{12}M'_{30}Ti_{54}O_{162}$ material in accordance with one or more embodiments of the present invention.
Figure 3B:
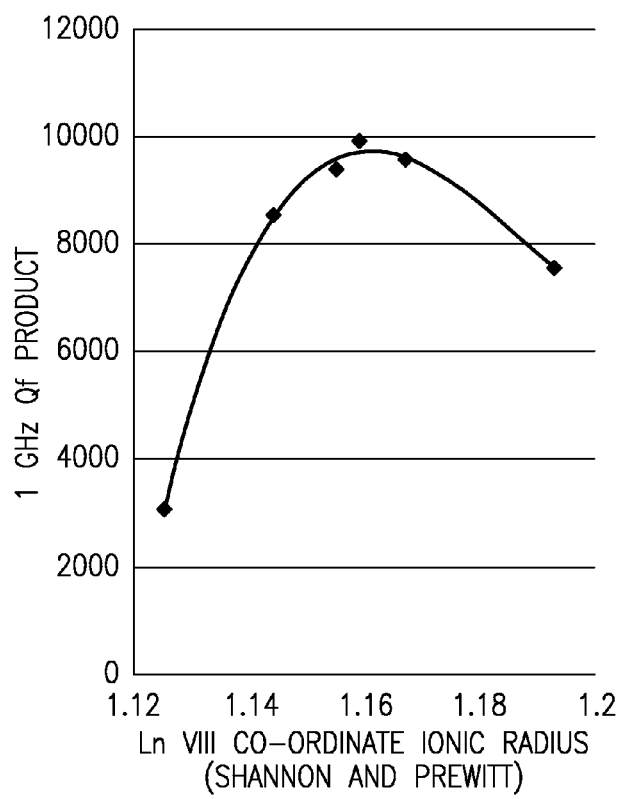

The effect of average ionic size of some of the substituting M' species on the frequency and the Q·f in the $Ba_{12}M'_{30}Ti_{54}O_{162}$ material are illustrated in FIGS. 3A and 3B, in accordance with one or more aspects of the present invention.

TABLE 6

| M'-site atoms | Shannon-Prewitt Radius |
|---|---|
| $Nd^{3+}$ | 1.249 |
| $Sm^{3+}$ | 1.219 |
| $Li^{+}$ | 1.06 |
| $Ca^{2+}$ | 1.20 |
| $Ce^{3+}$ | 1.283 |
| $Pr^{3+}$ | 1.266 |
| $Eu^{3+}$ | 1.206 |
| $Gd^{3+}$ | 1.193 |
| $Dy^{3+}$ | 1.167 |
| $Y^{3+}$ | 1.159 |
| $Ho^{3+}$ | 1.155 |

TABLE 6-continued

| M'-site atoms | Shannon-Prewitt Radius |
|---|---|
| $Er^{3+}$ | 1.144 |
| $Yb^{3+}$ | 1.125 |

TABLE 7

| M'', M'''-site atoms | Shannon-Prewitt Radius |
|---|---|
| $Ti^{4+}$ | 0.749 |
| $Mg^{2+}$ | 0.86 |
| $Ni^{2+}$ | 0.83 |
| $Zn^{2+}$ | 0.88 |
| $Co^{2+}$ | 0.885 |
| $Cu^{2+}$ | 0.87 |
| $Al^{3+}$ | 0.675 |
| $Fe^{3+}$ | 0.69 |
| $Mn^{3+}$ | 0.72 |
| $Ga^{3+}$ | 0.74 |
| $Cr^{3+}$ | 0.755 |
| $Sc^{3+}$ | 0.885 |
| $In^{3+}$ | 0.94 |
| $Yb^{3+}$ | 1.008 |
| $Ge^{4+}$ | 0.67 |
| $Sn^{4+}$ | 0.83 |
| $Zr^{4+}$ | 0.86 |
| $Hf^{4+}$ | 0.85 |
| $Ce^{4+}$ | 1.01 |
| $Pr^{4+}$ | 0.99 |
| $V^{5+}$ | 0.68 |
| $Nb^{5+}$ | 0.78 |
| $Ta^{5+}$ | 0.78 |
| $Mo^{6+}$ | 0.73 |
| $W^{6+}$ | 0.74 |

Figure 4A:
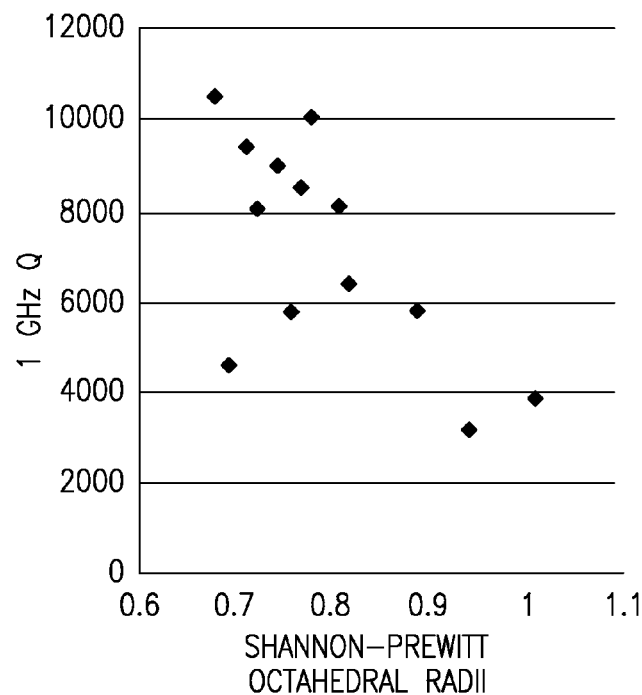
FIGS. 4A and 4B are graphs showing effects of substitution for Al into $Ba_{12}Nd_{18.48}Ti_{51.96}Al_{2.04}O_{162}$ relative to ionic size in accordance with one or more embodiments of the invention, with FIG. 4A showing the effect including coupled substitution and FIG. 4B showing the effect excluding coupled substitutions.
Figure 4B:
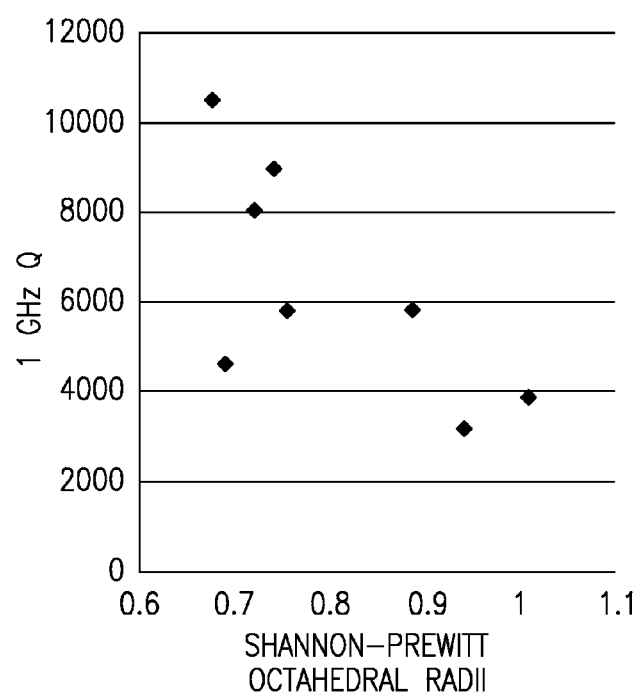

The effects of substitution for Al into $Ba_{12}Nd_{18.48}Ti_{51.96}Al_{2.04}O_{162}$ relative to ionic size are presented in Table 8 and illustrated in FIGS. 4A and 4B, in accordance with one or more aspects of the present invention.

Table 9 lists some properties of additives or dopants to $Ba_{12}Nd_{18.48}Sm_{10.2}Ti_{51.96}Al_{2.04}O_{162}$, in accordance with one or more aspects of the present invention.

TABLE 8

Substitution for Al in $Ba_{12}Nd_{18.48}Ti_{51.96}Al_{2.04}O_{162}$.

| Composition | Avg. Ionic Radius | Density | Dielectric Constant | Quality Factor $Q \cdot f$ (3 GHz) | Quality Factor $Q \cdot f$ (1 GHz) |
|---|---|---|---|---|---|
| $Ba_{12}Nd_{18.48}Sm_{10.2}Ti_{51.96}Al_{2.04}O_{162}$ | 0.675 | 5.78 | 75.26 | 14908 | 10500 |
| $Ba_{12}Nd_{18.48}Sm_{10.2}Ti_{51.96}Ga_{2.04}O_{162}$ | 0.74 | 5.71 | 73.91 | 13602 | 8981 |
| $Ba_{12}Nd_{18.48}Sm_{10.2}Ti_{51.96}Al_{1.02}Ga_{1.02}O_{162}$ | 0.075 | 5.75 | 74.64 | 13704 | 9392 |
| $Ba_{12}Nd_{18.48}Sm_{10.2}Ti_{51.96}Fe_{2.04}O_{162}$ | 0.69 | | | | 4610 |
| $Ba_{12}Nd_{18.48}Sm_{10.2}Ti_{51.96}Mn_{2.04}O_{162}$ | 0.72 | | | | 8045 |
| $Ba_{12}Nd_{18.48}Sm_{10.2}Ti_{51.96}Cr_{2.04}O_{162}$ | 0.755 | 5.77 | 75.04 | 11189 | 5785 |
| $Ba_{12}Nd_{18.48}Sm_{10.2}Ti_{51.96}Sc_{2.04}O_{162}$ | 0.885 | 5.65 | 71.36 | 9241 | 5827 |
| $Ba_{12}Nd_{18.48}Sm_{10.2}Ti_{51.96}In_{2.04}O_{162}$ | 0.94 | 5.77 | 72.57 | 4822 | 3167 |
| $Ba_{12}Nd_{18.48}Sm_{10.2}Ti_{51.96}Yb_{2.04}O_{162}$ | 1.008 | 5.65 | 68.06 | 8185 | 3876 |
| $Ba_{12}Nd_{18.48}Sm_{10.2}Ti_{51.96}Zn_{1.02}Ge_{1.02}O_{162}$ | 0.775 | | | | 10044 |
| $Ba_{12}Nd_{18.48}Sm_{10.2}Ti_{51.96}Mg_{1.02}Ge_{1.02}O_{162}$ | 0.765 | | | | 8509 |
| $Ba_{12}Nd_{18.48}Sm_{10.2}Ti_{51.96}Zn_{1.02}Ti_{1.02}O_{162}$ | 0.814 | 5.77 | 78.81 | 6983 | 6395 |
| $Ba_{12}Nd_{18.48}Sm_{10.2}Ti_{51.96}Mg_{1.02}Ti_{1.02}O_{162}$ | 0.804 | 5.71 | 77.84 | 9565 | 8101 |

TABLE 9

| Dopant | Quality Factor $Q \cdot f$ (1 GHz) | Quality Factor $Q \cdot f$ (3 GHz) | Comment |
|---|---|---|---|
| None | 9847 | | |
| +0.05 wt % $MnO_2$ | 9699 | | |
| +0.075 wt % $MnO_2$ | 9867 | | |
| +0.1 wt % $MnO_2$ | 10873 | 17156 | |
| +0.125 wt % $MnO_2$ | 9723 | | |
| +0.05 wt % $CeO_2$ | 8402 | | cracked |
| +0.075 wt % $CeO_2$ | 9969 | | |
| +0.15 wt % $CeO_2$ | | | cracked |
| +0.125 wt % $CeO_2$ | 7867 | | |
| +0.05 wt % $MnO_2$ + 0.05 wt % $CeO_2$ | 10927 | 17512 | |
| +0.1 wt % $MnO_2$ + 0.1 wt % $CeO_2$ | 9923 | | |
| +0.1 wt % $MnO_2$ + 0.05 wt % $CeO_2$ | 9541 | | |
| +0.05 wt % $MnO_2$ + 0.1 wt % $CeO_2$ | | | cracked |

Having now described some illustrative embodiments of the invention, it should be apparent to those skilled in the art that the foregoing is merely illustrative and not limiting, having been presented by way of example only. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described. For example, the reaction of the one or more precursor compounds into the dielectric ceramic material can be performed in an oxygen-containing atmosphere such as air or an environment with at least a desired partial oxygen pressure.

Numerous modifications and other embodiments are thus within the scope of one of ordinary skill in the art and are contemplated as falling within the scope of the invention. In particular, although many of the examples presented herein involve specific combinations, it should be understood that those acts and those elements may be combined in other ways. Further, those skilled in the art should appreciate that the parameters and configurations described herein are exemplary.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items.

Only the transitional phrases "consisting of" and "consisting essentially of," are closed or semi-closed transitional phrases, respectively, with respect to the claims. Further, the phrase "consisting essentially of" is intended to be a closed ended transitional phrase that encompass elements that are explicitly recited as well as those do not materially affect the basic and novel characteristics of the claimed subject matter.

Further one skilled in the art would also recognize that the claimed subject matter can include impurities that would be considered as normally occurring or naturally occurring. For example, the transitional phrases "consisting essentially of," and in some instances, the phrase "consisting of," contemplates the presence of impurities that could be introduced into the various compositions of the invention from any one or more of the precursor compounds, the dopant compounds, the processing equipment, such as but not limited to, the material-contacting surfaces thereof, the milling media, the one or more binder materials, the one or more plasticizer materials, and the one or more blending agents.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A dielectric composition comprising a material with a formula

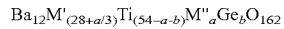

$Ba_{12}M'_{(28+a/3)}Ti_{(54-a-b)}M''_{a}Ge_{b}O_{162}$ where M' is at least one rare earth element selected from the group consisting of lanthanum, neodymium, samarium, gadolinium, and yttrium, M" is at least one element selected from the group consisting of aluminum, gallium, chromium, indium, scandium, and ytterbium, $0 \leq a \leq 6$, and $0 \leq b \leq 3$.

2. The dielectric composition of claim 1 wherein b is about 3.

3. The dielectric composition of claim 1 wherein b is about 0.1.

4. The dielectric composition of claim 1 further comprising a material selected from the group consisting of $BaTi_4O_9$, $Ba_2Ti_9O_{20}$, $TiO_2$, and $Nd_2Ti_2O_7$.

5. The dielectric composition of claim 1 wherein M' is at least one of neodymium, samarium, and yttrium, and M" is one of aluminum and gallium.

6. The dielectric composition of claim 5 wherein M' is neodymium and samarium, M" is aluminum, and b is about 0.3.

7. A dielectric composition comprising a material with a formula $$Ba_{12}M'_{(28+2x/3)}Ti_{(54-x-y)}M'''_xGe_yO_{162}$$

where M' is at least one rare earth element selected from the group consisting of lanthanum, neodymium, samarium, gadolinium, and yttrium, M''' is at least one metal selected from the group consisting of magnesium, zinc, nickel, and cobalt, $0 \leq x \leq 3$, and $0 \leq y \leq 3$.

8. The dielectric composition of claim 7 wherein y is about 3.

9. The dielectric composition of claim 7 wherein y is about 0.1.

10. The dielectric composition of claim 7 further comprising a material selected from the group consisting of $BaTi_4O_9$, $Ba_2Ti_9O_{20}$, $TiO_2$, and $Nd_2Ti_2O_7$.

11. A method of fabricating a dielectric component comprising:
blending a precursor mixture of compounds including a barium source, a titanium source, at least one rare earth element source, and at least one metal source;
promoting reaction of the compounds to from a green material;
comminuting the green material into green dielectric particles having a maximum target diameter;
forming a green dielectric member from the green dielectric particles; and
sintering the green dielectric member to produce the dielectric component, the dielectric component including a dielectric material having a formula of $$Ba_{12}M'_{(28+a/3)}Ti_{(54-a-b)}M''_aGe_bO_{162}$$

with $0 \leq a \leq 6$ and $0 \leq b \leq 3$
or $$Ba_{12}M'_{(28+2x/3)}Ti_{(54-x-y)}M'''_xGe_yO_{162},$$

with $0 \leq x \leq 3$ and $0 \leq y \leq 3$
where M' is at least one rare earth element selected from the group consisting of lanthanum, neodymium, samarium, gadolinium, and yttrium, M" is at least one element selected from aluminum, gallium, chromium, indium, scandium, and ytterbium, and M''' is at least one metal selected from the group consisting of magnesium, zinc, cobalt, and nickel.

12. The method of claim 11 further comprising adding a binder to the green dielectric particles prior to forming the green dielectric member from the green dielectric particles.

13. The method of claim 12 wherein promoting reaction of the compounds comprises:
heating the precursor mixture at a first heating rate of less than or equal to about 300° C. per hour to a reaction temperature that is in a range of about 1,000° C. to about 1,400° C.;
exposing the precursor mixture to the reaction temperature for a period in a range of between about four hours and about twelve hours to form a first product; and
cooling the first product to about room temperature at a first cooling rate in a range of about 100° C. per hour to about 600° C. per hour to form the green material.

14. The method of claim 13 wherein sintering the green dielectric member to produce the dielectric component comprises:
heating the green dielectric member at a second heating rate of less than or equal to about 200° C. per hour to a sintering temperature that is in a range of about 1,300° C. to about 1,500° C.;
exposing the green dielectric member to the sintering temperature for a sintering period in a range of between about two hours and about eight hours to form a sintered dielectric product; and
cooling the sintered dielectric product to about room temperature at a second cooling rate in a range of 50° C. per hour to about 200° C. per hour to produce the dielectric component.

15. The method of claim 14 wherein forming the green dielectric particles into the dielectric member comprises:
adding a binder to the green dielectric particles; and
shaping the green dielectric particles into the dielectric member to a green density that is at least about 50% of the theoretical density of the dielectric material.

16. The method of claim 15 further comprising machining the dielectric component into a dielectric resonator having at least one target physical characteristic.

17. The method of claim 11 wherein the maximum target diameter is less than or equal to about 10 microns.

18. The method of claim 11 further comprising providing the precursor mixture of compounds in target relative stoichiometric amounts to produce the dielectric material having M' as at least one of neodymium and samarium, and M" as aluminum.

* * * * *